(12) United States Patent
Roesler et al.

(10) Patent No.: US 7,705,087 B2
(45) Date of Patent: Apr. 27, 2010

(54) POLYURETHANE/UREA CONTAINING PENDANT ALKOXYSILANE GROUPS

(75) Inventors: Richard R. Roesler, Wexford, PA (US); Lyubov K. Gindin, Pittsburgh, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 0 days.

(21) Appl. No.: 11/920,390

(22) PCT Filed: May 18, 2005

(86) PCT No.: PCT/US2005/017502

§ 371 (c)(1),
(2), (4) Date: Nov. 14, 2007

(87) PCT Pub. No.: WO2006/124035

PCT Pub. Date: Nov. 23, 2006

(65) Prior Publication Data

US 2009/0069497 A1    Mar. 12, 2009

(51) Int. Cl.
| | | |
|---|---|---|
| *C08G 18/08* | (2006.01) | |
| *C08G 18/71* | (2006.01) | |
| *C08G 77/04* | (2006.01) | |
| *C08G 77/06* | (2006.01) | |
| *C08J 3/00* | (2006.01) | |
| *C08K 3/20* | (2006.01) | |
| *C08L 75/00* | (2006.01) | |
| *C08L 83/00* | (2006.01) | |
| *C08L 83/04* | (2006.01) | |
| *D06M 15/643* | (2006.01) | |

(52) U.S. Cl. .................. 524/588; 524/590; 524/591; 524/837; 524/838; 524/839; 524/840; 528/28; 528/29; 528/69

(58) Field of Classification Search ............. 524/588, 524/590, 591, 837, 838, 839, 840; 528/28, 528/29, 69
See application file for complete search history.

(56) References Cited

U.S. PATENT DOCUMENTS

| 4,567,228 A | 1/1986 | Gaa et al. ............... 524/588 |
| 4,582,873 A | 4/1986 | Gaa et al. ............... 524/591 |
| 5,041,494 A | 8/1991 | Franke et al. .......... 524/588 |
| 5,859,118 A * | 1/1999 | Roesler et al. .......... 524/493 |
| 2002/0146382 A1 | 10/2002 | Mallo et al. .......... 424/70.122 |

* cited by examiner

*Primary Examiner*—Patrick D Niland
(74) *Attorney, Agent, or Firm*—Robert S. Klemz; Noland J. Cheung

(57) ABSTRACT

The present invention relates to polyurethane/ureas wherein the polyurethane/ureas contain 0.5 to 6% by weight, based on the weight of the polyurethane/ureas, of alkoxysilane groups (calculated as Si, MW 28), which have been incorporated by the reaction of isocyanate groups with a dihydroxy compound containing urea and alkoxysilane groups, and wherein the polyurethane/ureas optionally contain hydrophilic groups and are optionally dispersed in an aqueous medium.

The present invention also relates to a process for preparing these polyurethane/urea and to their use for preparing coatings.

14 Claims, No Drawings

POLYURETHANE/UREA CONTAINING PENDANT ALKOXYSILANE GROUPS

BACKGROUND OF THE INVENTION

1. Field of the Invention

The present invention relates to polyurethane/ureas, in particular, aqueous polyurethane/urea dispersions wherein the polyurethane/ureas contain pendant alkoxysilane groups.

2. Description of Related Art

The production of linear or cross-linked solvent-based polyurethane/ureas and aqueous polyurethane/urea dispersions are well known. The solvent-based polyurethane/ureas and the aqueous polyurethane/urea dispersions may be used for a wide range of commercial applications such as adhesives or coatings for various substrates including textile fabrics, plastic, wood, glass fibers and metals. Chemical resistance, abrasion resistance, toughness, tensile strength, elasticity and durability are among the many desirable properties of these coatings.

Regardless of the property level which may be obtained for coatings prepared from commercial polyurethane/ureas, there is a continuing need to improve these properties, in particular water resistance, solvent resistance, weather resistance and physical properties such as abrasion resistance.

It is an object of the present invention to provide polyurethane/ureas, in particular, aqueous polyurethane/urea dispersions, which can be used to prepare coatings that possess these properties and still retain the other valuable properties of the polyurethane ureas.

This object may be achieved in accordance with the present invention by preparing the polyurethane/ureas, in particular, the polyurethane/urea dispersions containing pendant alkoxysilane groups from dihydroxy compounds containing urea and alkoxysilane groups.

Aqueous polyurethane dispersions containing pendant alkoxysilane groups are known and disclosed, e.g., in U.S. Pat. Nos. 4,567,228, 4,582,873 and 5,041,494 and Published Application No. WO 03/11937. However, in these applications the alkoxysilane groups are incorporated through mixed primary/secondary diamines containing alkoxysilane groups instead of dihydroxy compounds containing urea and alkoxysilane groups as required by the present invention. An advantage of incorporating the alkoxysilane groups in accordance with the present invention is that the alkoxysilane groups are incorporated by the formation of urethane groups instead of urea groups as in the prior art. The presence of urethane groups generally results in a product having a lower viscosity than a similar product containing more urea groups.

SUMMARY OF THE INVENTION

The present invention relates to polyurethane/ureas wherein the polyurethane/ureas contain 0.5 to 6% by weight, based on the weight of the polyurethane/ureas, of alkoxysilane groups (calculated as Si, MW 28), which have been incorporated by the reaction of isocyanate groups with a dihydroxy compound containing urea and alkoxysilane groups, and wherein the polyurethane/ureas optionally contain hydrophilic groups and are optionally dispersed in an aqueous medium.

The present invention also relates to a process for preparing an aqueous polyurethane/urea dispersion by a) preparing a prepolymer having at least two isocyanate groups by reacting an excess of an organic polyisocyanate with a high molecular weight polyol, a dihydroxy compound containing urea and alkoxysilane groups, optionally an isocyanate-reactive compound containing hydrophilic groups and optionally a low molecular weight isocyanate-reactive compound, b) chain extending the prepolymer prepared in step a) by reacting the prepolymer with an amine chain extender, and c) optionally dispersing the prepolymer of step a) or the chain extended prepolymer of step b) in an aqueous medium either before, during or after step b).

Finally, the present invention relates to coatings prepared from the polyurethane/ureas and the aqueous polyurethane/urea dispersions.

DETAILED DESCRIPTION OF THE INVENTION

In accordance with the present invention the term "polyurethane/urea" means polymers containing urethane and/or urea groups. As used herein the term "hydrophilic groups" refers to substituent and/or pendant groups on a polyurethane/urea that improve the compatibility, dispersibility, and/or solubility of the polyurethane/urea with and/or in water or an aqueous medium. Non-limiting examples of hydrophilic moieties and/or groups that can be used in the present invention are described below and include polyether groups, which typically include repeating ethylene oxide units, and ionic groups such as anionic or cationic groups.

Any of the known starting materials for preparing polyurethane/ureas may be according to the present invention, provided that sufficient isocyanate groups are reacted with dihydroxy compounds containing urea and alkoxysilane groups to obtain the required alkoxysilane group content.

Suitable dihydroxy compounds containing urea and alkoxysilane groups and aspartate groups are those corresponding to formula I

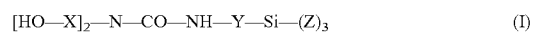

$$[\text{HO}-\text{X}]_2-\text{N}-\text{CO}-\text{NH}-\text{Y}-\text{Si}-(\text{Z})_3 \quad (\text{I})$$

wherein

X represents the same or different linear or branched alkylene groups having 1 to 4 carbon atoms, preferably a linear or branched alkylene group having 2 to 4 carbon atoms and more preferably an ethylene group, Y represents a linear or branched alkylene group having 1 to 8 carbon atoms, preferably a linear or branched alkylene group having 2 to 4 carbon atoms, and more preferably a propylene group, and Z independently represents organic groups that are inert to isocyanate groups below 100° C., provided that at least one group is an alkoxy group containing from 1 to 4 carbon atoms, preferably alkyl or alkoxy groups having 1 to 4 carbon atoms, and more preferably alkoxy groups.

The compounds corresponding to formula I are prepared by reacting a compound corresponding to formula II

$$\text{OCN}-\text{Y}-\text{Si}-(\text{Z})_3 \quad (\text{II})$$

with a compound corresponding to formula III

$$[\text{HO}-\text{X}]_2-\text{NH} \quad (\text{III})$$

wherein X, Y and Z are as defined above.

Examples of compounds corresponding to formula II include 3-isocyanatopropyl-trimethoxysilane, 3-isocyanatopropyl-methyldimethoxy-silane, 2-isocyanatoethyl-trimethoxysilane, 3-isocyanatobutyl-trimethoxy-silane, 4-isocyanatobutyl-trimethoxysilane, and isocyanatomethyl-trimethoxysilane, the corresponding triethoxysilanes and methyldiethoxy-silanes, the corresponding mixed methoxy/ ethoxysilanes and the corresponding mixed methyl/methoxy/ethoxysilanes. 3-isocyanatopropyl-trimethoxysilane is especially preferred.

Examples of compounds corresponding to formula III include diethanol amine, the isomeric dipropanol amines and the isomeric diisobutanol amines. Diethanol amine is especially preferred.

The dihydroxy compounds containing urea and alkoxysilane groups are present in an amount sufficient to incorporate a minimum of 0.5%, preferably 1.0% and more preferably 1.3% by weight, and a maximum amount of 6%, preferably 4% and more preferably 3% by weight, of alkoxysilane groups (calculated as Si, MW 28), wherein the percentages are based on the weight of the polyurethane/ureas.

Suitable polyisocyanates which may be used to prepare the polyurethane/ureas are known and include organic diisocyanates represented by the formula, $R(NCO)_2$, in which R represents an organic group obtained by removing the isocyanate groups from an organic diisocyanate having a molecular weight of from about 140 to 400. Diisocyanates preferred for the process according to the invention are those represented by the above formula in which R represents a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms or a divalent aromatic hydrocarbon group having 6 to 15 carbon atoms.

Examples of suitable organic diisocyanates include 1,4-tetramethylene diisocyanate, 1,6-hexamethylene diisocyanate, 2,2,4-trimethyl-1,6-hexamethylene diisocyanate, cyclohexane-1,3- and -1,4-diisocyanate, 1-isocyanato-3-isocyanatomethyl-3,5,5-trimethyl-cyclohexane (isophorone diisocyanate or IPDI), bis-(4-isocyanato-cyclohexyl)-methane, 1,3- and 1,4-bis-(isocyanatomethyl)-cyclohexane, 2,4'-diisocyanato-dicyclohexyl methane, bis-(4-isocyanato-3-methyl-cyclohexyl)-methane, $\alpha,\alpha,\alpha',\alpha'$-tetramethyl-1,3- and/or -1,4-xylylene diisocyanate, 1-isocyanato-1-methyl-4(3)-isocyanatomethyl cyclohexane, 2,4- and/or 2,6-toluylene diisocyanate, 2,4- and/or 4,4'-diphenylmethane diisocyanate and mixtures thereof.

Polyisocyanates containing 3 or more isocyanate groups such as 4-isocyanatomethyl-1,8-octamethylene diisocyanate and aromatic polyisocyanates such as 4,4',4''-triphenylmethane triisocyanate and polyphenyl polymethylene polyisocyanates obtained by phosgenating aniline/formaldehyde condensates may also be used.

Preferred diisocyanates are bis-(4-isocyanatocyclohexyl)-methane, 1,6-hexamethylene diisocyanate and isophorone diisocyanate, especially bis-(4-isocyanatocyclohexyl)-methane and isophorone diisocyanate.

Organic compounds containing at least two isocyanate-reactive groups, which may be reacted with the previously described organic polyisocyanates to prepare the polyurethane/ureas, can be divided into two groups, i.e., high molecular weight compounds having molecular weights from 400 to about 6,000, preferably from 800 to about 3,000, and low molecular weight compounds (chain extenders) having molecular weights below 400. The molecular weights are number average molecular weights ($M_n$) and are determined by end group analysis (OH number).

Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred. Examples of these polyols and the starting materials for preparing them are disclosed in U.S. Pat. Nos. 4,701,480 and 5,932,652, herein incorporated by reference.

While the presence of the previously described high molecular weight polyols is optional, they are preferably used in amount of at least 5%, more preferably at least 10% by weight, based on the weight of the polyurethane/urea. The maximum amount of these polyols is preferably 85%, more preferably 75% by weight, based on the weight of the polyurethane/urea.

The low molecular weight isocyanate-reactive component having an average molecular weight of up to 400 is selected from the polyhydric alcohols, preferably dihydric alcohols, and low molecular polyamines, preferably diamines, which are described in the U.S. patents previously incorporated by reference. Also suitable are aldimines as disclosed in U.S. Pat. No. 5,569,706, herein incorporated by reference.

In addition to the above-mentioned components which are preferably difunctional in the isocyanate polyaddition reaction, mono-functional and even small portions of trifunctional and higher functional components generally known in polyurethane chemistry, such as trimethylolpropane, may be used in special cases in which slight branching of the NCO prepolymer or polyurethane/urea is desired. However, the NCO prepolymers used for preparing aqueous polyurethane/urea dispersions should be substantially linear and this may be achieved by maintaining the average functionality of the prepolymer starting components below about 2.1. The NCO prepolymers used for preparing solvent-based polyurethane/urea dispersions may be branched and this may be achieved by maintaining the average functionality of the starting components below about 2.5, preferably below 2.1.

In order to enable the polyurethane/urea to be stably dispersed in an aqueous medium, ionic or potential ionic groups and/or lateral or terminal, hydrophilic ethylene oxide units may be chemically incorporated into the polyurethane/urea. The ionic or potential ionic groups may be either anionic or cationic, preferably anionic. Examples of anionic groups include carboxylate and sulfonate groups, while examples of cationic groups include ammonium and sulfonium groups. The ionic groups are incorporated in an amount sufficient to provide an ionic group content of 0 to 200 milliequivalents per 100 g of polyurethane/urea. When the ionic or potential ionic groups are incorporated, they are preferably incorporated in an amount sufficient to provide an ionic group content of at least 10, preferably at least 20 milliequivalents per 100 g of polyurethane/urea. The upper limit for the content of ionic groups is preferably 180, more preferably 100 milliequivalents per 100 g of polyurethane/urea.

The content of hydrophilic ethylene oxide units may be up to about 10%, preferably up to about 8%, more preferably about 1 to 6% and most preferably about 2 to 6%, by weight, based on the weight of the polyurethane/urea. In addition, up to about 75% of the allowable, chemically incorporated, hydrophilic ethylene oxide units may be replaced by the known nonionic, external emulsifiers.

The ionic or potential ionic groups may be chemically incorporated into the NCO prepolymer or may be chemically incorporated through the chain extender which is used to form the polyurethane/urea from the prepolymer. The ionic groups are formed by neutralizing the corresponding potential ionic groups either prior to, during or after formation of the polyurethane/urea. When the potential ionic groups are neutralized prior to their incorporation into the polyurethane/urea, the ionic groups are incorporated directly. When neutralization is performed subsequent to forming the polyurethane/urea, potential ionic groups are incorporated.

Compounds for incorporating ionic groups or potential ionic groups into the polyurethane/ureas are well known. Suitable compounds for incorporating the carboxylate, sulfonate and quaternary nitrogen groups are described in U.S. Pat. Nos. 3,412,054, 3,479,310, 4,108,814 and 4,303,774, 4,501,852 and 4,701,480, the disclosures of which are herein incorporated by reference. The preferred sulfonate groups for incorporation into the NCO prepolymer are the diol sulfonic acids or the diol sulfonates disclosed in U.S. Pat. No. 4,108,814.

The neutralizing agents for converting the potential ionic groups to ionic groups are also known and are described in the preceding U.S. patents. Within the context of this invention, the term "neutralizing agents" is meant to embrace all types of agents which are useful for converting potential ionic groups to ionic groups.

Suitable compounds for incorporating the lateral or terminal, hydrophilic ethylene oxide units may be either monofunctional or difunctional in the context of the isocyanate-polyaddition reaction. Examples of these compounds are disclosed in U.S. Pat. Nos. 3,905,929, 3,920,598 and 4,190,566 (the disclosures of which are herein incorporated by reference). Preferred hydrophilic components are the monohydroxy polyethers having terminal hydrophilic chains containing ethylene oxide units. These hydrophilic components may be produced as described in the preceding patents by alkoxylating a monofunctional starter, such as methanol or n-butanol, using ethylene oxide and optionally another alkylene oxide, for example propylene oxide.

The solvent-based polyurethane/ureas and the aqueous polyurethane/urea dispersions according to the invention may be prepared by either a one-step or a two-step process, preferably by a two-step process. In the one-step process all of the components are mixed together and reacted in one step. In the two-step process an NCO prepolymer is formed in the first step and is subsequently reacted with a low molecular weight, isocyanate-reactive chain extender, preferably an amine chain extender, in the second step to form the polyurethane/urea. In the preparation of aqueous polyurethane/urea dispersions the chain extension step is conducted either before, during or after the NCO prepolymer is mixed with an aqueous medium.

The NCO prepolymer is preferably prepared by reacting an excess of an organic polyisocyanate with a dihydroxy compound containing urea and alkoxysilane groups, optionally a high molecular weight polyol, optionally a low molecular weight organic component containing at least two isocyanate-reactive groups and optionally the isocyanate-reactive compounds containing at least one ionic group, at least one potential ionic group or hydrophilic ethylene oxide units. The ratio of isocyanate groups to isocyanate-reactive groups is maintained between about 1.1 to 5, preferably about 1.2 to 3 and most preferably about 1.3 to 2.0 on an equivalent basis. The above components may be reacted simultaneously or sequentially to produce the NCO prepolymer. The finished prepolymer preferably has a free isocyanate content of about 1 to 20%, more preferably about 1 to 10% by weight, based on the weight of prepolymer solids.

The prepolymers may be prepared in the presence of solvent provided that the solvent is substantially nonreactive in the context of the isocyanate-polyaddition reaction. Examples of suitable solvents include dimethylformamide, esters, ethers, ketoesters, ketones, e.g., methyl ethyl ketone and acetone, glycol-ether-esters, chlorinated hydrocarbons, aliphatic and alicyclic hydrocarbon-substituted pyrrolidinones, e.g., N-methyl-2-pyrrolidinone, hydrogenated furans, aromatic hydrocarbons and mixtures thereof.

In addition to the preceding organic solvents, it is also possible to use silicon-containing reactive diluents as solvents during the production of the prepolymers and for the resulting coating compositions. Examples of these reactive diluents include tetramethoxy silane, tetraethoxy silane, methyl triethoxy silane, methyl trimethoxy silane, ethyl triethoxy silane, octyl triethoxy silane and dimethyl diethoxy silane.

The use of these reactive diluents provides two important benefits. First, the coating compositions contains less environmentally regulated organic solvent. Second, the reactive diluent is also a co-reactant for the polyurethane/urea dispersion and provides a composition with increased inorganic character. Coatings prepared from these compositions have different performance properties when compared to coatings prepared from compositions that do not contain these reactive diluents.

When preparing aqueous polyurethane/urea dispersions suitable neutralizing or quaternizing agents for converting the potential anionic groups to anionic groups either before, during or after their incorporation into the polyurethane/ureas, are tertiary amines, alkali metal cations or ammonia. Examples of these neutralizing agents are disclosed in U.S. Pat. Nos. 4,501,852 and 4,701,480, which are incorporated by reference. Preferred neutralizing agents are the trialkyl-substituted tertiary amines and include triethyl amine, N,N-dimethyl-ethanol amine, triethanol amine and N-methyl-diethanol amine. Suitable neutralizing agents for converting potential cationic groups to cationic groups are disclosed in U.S. Pat. Nos. 3,479,310 and 3,419,533, which are incorporated by reference.

A sufficient amount of the potential ionic groups must be neutralized so that when combined with the hydrophilic ethylene oxide units and optional external emulsifiers, the polyurethane/urea final product will be a stable dispersion. Generally, at least about 75%, preferably at least about 90%, of the potential ionic groups are neutralized to the corresponding ionic groups.

The NCO prepolymers may be converted into aqueous polyurethane/urea dispersions in accordance with the methods known in polyurethane chemistry and described, e.g., in "Waterborne Polyurethanes," Rosthauser et al, Advances in Urethane Science and Technology, Vol. 10, pg. 121-162 (1987).

According to one process for preparing the polyurethane/urea dispersions, the NCO prepolymer is prepared, chain extended and/or chain terminated to form a polyurethane/urea and subsequently dispersed in water. This process is disclosed in U.S. Pat. No. 3,479,310, herein incorporated by reference.

When amines are reacted with the NCO prepolymer either as chain terminators or chain extenders, a preferred method of reacting the NCO prepolymers with amino group-containing compounds is by dispersing the prepolymer in water and then reacting the prepolymer with the amino group-containing compounds, which may be mixed with water either before, during or after dispersing the NCO prepolymer. The number of amine nitrogens per molecule is about 2 to 6, more preferably about 2 to 4 and most preferably about 2 to 3. Any desired functionality can be obtained by using mixtures of polyamines. Examples of polyamines for use as component b) include those disclosed in U.S. Pat. No. 4,408,008, herein incorporated by reference. Especially preferred polyamines include 1-amino-3-aminomethyl-3,5,5-trimethylcyclohexane (isophorone diamine or IPDA), bis-(4-amino-cyclohexyl)-methane, bis-(4-amino-3-methylcyclohexyl)-methane, 1,6-diaminohexane, hydrazine, ethylene diamine and diethylene triamine.

The amount of amino group-containing compounds to be used in accordance with the present invention is dependent upon the number of isocyanate groups in the prepolymer. Generally, the ratio of isocyanate groups amino groups is 1.0:0.6 to 1.0:1.1, preferably 1.0:0.8 to 1.0:0.98 on an equivalent basis.

When preparing dispersions the final product is a stable, aqueous dispersion of polyurethane/urea particles having a solids content of up to 60% by weight, preferably 15 to 60% by weight and more preferably 30 to 45% by weight. However, it is always possible to dilute the dispersions to any minimum solids content desired.

The dispersions may be blended with other dispersions or with other known additives such as fillers, plasticizers, pigments, carbon black, silica sols and the known levelling agents, wetting agents, antifoaming agents and stabilizers.

In order to improve the chemical resistance and hardness of the polyurethane/ureas according to the invention, they may be blended with colloidal silica in amounts of up to 70% based on the weight of the resulting composition. The improvement is believed to be due to the fact that the colloidal silica contains polysilicon dioxide with Si—OH radicals on the surface of each particle. These Si—OH radicals can react with silanes so that a chemical bond exists between the inorganic modified organic matrix and the silica particle. It is believed that this imparts a character to the film, not unlike an elastomer, where hard domains are surrounded by a soft continuous phase. Suitable examples of colloidal silica include those having various particle sizes and surface treatments, such as sodium or ammonium hydroxide. Examples of surface treatments include alkali or acid washing. Alkali washing is preferred for polyurethane/ureas containing anionic groups and acid washing is preferred for polyurethane/ureas containing cationic groups.

The aqueous polyurethane/urea dispersions are suitable for coating and impregnating woven and nonwoven textiles, leather, paper, wood, metals, ceramics, stone, concrete, bitumen, hard fibers, straw, glass, porcelain, plastics of a variety of different types, glass fibers for antistatic and crease-resistant finishing; as binders for nonwovens, adhesives, adhesion promoters, laminating agents, hydrophobizing agents, plasticizers; as binders, for example, for cork powder or sawdust, glass fibers, asbestos, paper-like materials, plastics or rubber waste, ceramic materials; as auxiliaries in textile printing and in the paper industry; as additives to polymers as sizing agents, for example, for glass fibers; and for finishing leather.

Drying of the products obtained by various application techniques may be carried out either at room temperature or at elevated temperature. When the products are cured, water evaporates and the silane groups react with one another to form Si—O—Si linkages, which provide additional crosslinking. For this reason the molecular weight of the products does not have to as high as prior art products to attain similar performance levels. This means that the viscosity of the polyurethane/urea is lower, which means that higher solids products can be obtained or less solvent is necessary.

The invention is further illustrated but is not intended to be limited by the following examples in which all parts and percentages are by weight unless otherwise specified.

EXAMPLES

Aqueous polyurethane/urea dispersions containing pendant alkoxysilane groups were prepared from the materials described hereinafter.

Example 1

Preparation of Dihydroxy Compound Containing Urea and Alkoxysilane Groups

To a 250 ml flask fitted with agitator, thermocouple, nitrogen inlet and addition funnel with condenser were added 29.85 g diethanolamine (0.284 eq) and 70.15 g (0.284 eq) of 3-isocyanatopropyl-trimethoxysilane (Silquest® A1310, available from Witco Corporation) was added by addition funnel over a 30-minute period. The temperature of the reactor did not exceed 60° C. during the addition. The reactor was maintained at 80° C. for an additional 30 minutes at which time the product was poured into glass containers and sealed under a blanket of nitrogen. The isocyanate content was zero.

Example 2

Preparation of Aqueous Polyurethane/Urea Dispersion

The ingredients in the table below were used to prepare an aqueous polyurethane/urea dispersion containing pendent alkoxysilane groups.

| Ingredient | Prepolymer |
| --- | --- |
| Charge 1 | |
| Polyester A | 46.84 g |
| 1700 Mn (number average molecular weight) polyester diol made from adipic acid, neopentyl glycol and hexane diol | |
| Polyester B | 70.63 g |
| 840 Mn polyester made from adipic acid and hexane diol | |
| Monool | 17.2 g |
| mono-hydroxy functional polyether prepared from butylcarbitol as a starter and chain extended with 84.4 mole % EO and 15.5 mole % PO groups with Mn approximately 2200. | |
| Trimethylol propane | 4.1 g |
| Dimethylol propionic acid | 15 g |
| N-methylpyrolidone | 158 g |
| Charge 2 | |
| Bis-(4-isocyanatocyclohexyl)-methane | 106.6 g |
| Desmodur ® W with 31.8% NCO and 132 equivalent weight (available from Bayer MaterialScience) | |
| HDI | 45.6 g |
| Charge 3 | |
| Stannous octoate | 2 drops |
| Charge 4 | |
| Dihydroxy Compound from Example 1 | 41.1 g |
| Charge 5 | |
| Triethyl amine | 8.1 g |

Charge 1 was added to a 1-liter flask fitted with agitator, thermocouple, nitrogen inlet and addition funnel with condenser. The mixture was heated to 70° C. and charge 2 was added, mixed and then charge 3 was added. The mixture was then heated to 90° C. and held at that temperature for 90 minutes. Charge 4 was added and the mixture was maintained at 90° C. for 120 minutes. At this point the NCO content was determined to be 4.39 wt. % (theoretical 4.79 wt. %) and the mixture was cooled to 70° C. and charge 5 was added to neutralize the mixture and mixed for 15 minutes.

The neutralized mixture (480.6 g) was added under high shear to 520 g of water at 25° C. in a 3-litter resin flask equipped with agitator, thermocouple, addition funnel, and condenser. A mixture of 50 g of water, 10.2 g of diethanolamine and 10.9 g of ethylenediamine was added dropwise to the mixture at 80° C. over a 30 minute period under high shear, which was maintained for an additional 30 minutes. The dispersion was then cooled to ambient temperature and discharged. The opaque dispersion was stable for four weeks at ambient conditions, meaning that no visible settling of the dispersion or change in viscosity was observed.

The % solids, NCO content and NMP content were calculated based on the particular formulation. Viscosity measurements were made using a Brookfield® Viscometer, Brookfield engineering, Inc., Middleboro, Mass., spindle no.1, 50 rpm at 25° C. at 25° C. Particle size was determined on a HORIBA® LA-910 particle size analyzer available from HORIBA Laboratory Products, Irvine, Calif.

| | |
|---|---|
| Solids | 35.5 wt. % |
| NCO Content | 4.39 wt. % |
| NMP Content | 14.3 wt. % |
| PH | 7.5 |
| Viscosity | 1270 cps |
| Particle Size | 200 nm |

Cold rolled steel Q-panels available from Q-panel Company, Farnworth, UK, were prepared using the dispersion of Example 2 as a coating. The dispersion was cast as a 10 mil wet film, which resulted in a 2 mil dry film. One coated panel was allowed to dry at ambient conditions for one week and another coated panel was dried at ambient conditions for 30 minutes and then was placed in a 150° C. oven for ten minutes. Both cured/dried coatings were clear and glossy by visual inspection and flexible as indicated by no visual defects in the coating after bending the panel 180°.

Methyl ethyl ketone (MEK) double rubs were measured as follows. The ball of a 2 lb ball pein hammer was securely wrapped with several layers of cloth (8"×8" cloth folded twice) and secured using a rubber band. The cloth was saturated with MEK. The wet ball pien hammer wais laid on the coating surface, so that the ball pein is at a 90° angle to the surface. Without applying downward pressure, the hammer is pushed back and forth over an approximately 4" long area of the coating. One forward and back motion was counted as 1 double rub. The cloth was resaturated with MEK after every 25 double rubs. The coatings passed 100 MEK double rubs with no deterioration of the coating i.e., clarity and gloss did not visibly change.

The data demonstrate that the coatings obtained were clear, glossy, flexible films with good solvent resistance.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Polyurethane/ureas wherein the polyurethane/ureas contain 0.5 to 6% by weight, based on the weight of the polyurethane/ureas, of alkoxysilane groups (calculated as Si, MW 28), which have been incorporated by the reaction of isocyanate groups with a dihydroxy compound containing urea and alkoxysilane groups, said dihydroxy compound corresponding to the formula I

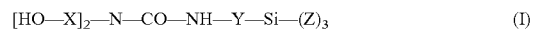
[HO—X]$_2$—N—CO—NH—Y—Si—(Z)$_3$ (I)

wherein
X represents the same or different C$_1$-C$_4$ linear or branched alkylene groups,
Y represents a linear or branched alkylene group having 1 to 8 carbon atoms, and
Z independently represents organic groups that are inert to isocyanate groups below 100° C., provided that at least one group is an alkoxy group containing from 1 to 4 carbon atoms;
and wherein the polyurethane/ureas optionally contain hydrophilic groups and are optionally dispersed in an aqueous medium.

2. The polyurethane/ureas of claim 1 wherein
X represents an ethylene group,
Y represents a propylene group, and
Z represents a methoxy group.

3. The polyurethane/ureas of claim 1 wherein the polyurethane/ureas contain hydrophilic groups and are dispersed in an aqueous medium.

4. The polyurethane/ureas of claim 2 wherein the polyurethane/ureas contain hydrophilic groups and are dispersed in an aqueous medium.

5. The polyurethane/ureas of claim 3 wherein said polyurethane/ureas contain 10 to 120 milliequivalents, per 100 grams of polyurethane/ureas, of chemically incorporated anionic groups and up to about 10% by weight, based on the weight of said polyurethane/ureas, of lateral and/or terminal hydrophilic chains containing ethylene oxide units.

6. The polyurethane/ureas of claim 4 wherein said polyurethane/ureas contain 10 to 120 milliequivalents, per 100 grams of polyurethane/ureas, of chemically incorporated anionic groups and up to about 10% by weight, based on the weight of said polyurethane/ureas, of lateral and/or terminal hydrophilic chains containing ethylene oxide units.

7. A process for preparing an polyurethane/ureas which comprises
a) preparing a prepolymer having at least two isocyanate groups by reacting an excess of an organic polyisocyanate with a high molecular weight polyol, a dihydroxy compound containing urea and alkoxysilane groups, optionally an isocyanate-reactive compound containing hydrophilic groups and optionally a low molecular weight isocyanate-reactive compound, said dihydroxy compound corresponding to the formula I

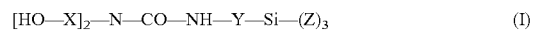
[HO—X]$_2$—N—CO—NH—Y—Si—(Z)$_3$ (I)

wherein
X represents the same or different C$_1$-C$_4$ linear or branched alkylene groups,
Y represents a linear or branched alkylene group having 1 to 8 carbon atoms, and Z independently represents organic groups that are inert to isocyanate groups below 100° C., provided that at least one group is an alkoxy group containing from 1 to 4 carbon atoms;

b) chain extending the prepolymer prepared in step a) by reacting the prepolymer with an amine chain extender, and c) optionally dispersing the prepolymer of step a) or the chain extended prepolymer of step b) in an aqueous medium either before, during or after step b).

8. The process of claim 7 wherein
X represents an ethylene group,
Y represents a propylene group, and
Z represents a methoxy group.

9. The process of claim 7 wherein the optional isocyanate-reactive compound containing hydrophilic groups is present and step c) is carried out.

10. The process of claim 8 wherein the optional isocyanate-reactive compound containing hydrophilic groups is present and step c) is carried out.

11. The process of claim 9 wherein said polyurethane/ureas contain 10 to 120 milliequivalents, per 100 grams of polyurethane/ureas, of chemically incorporated anionic groups and up to about 10% by weight, based on the weight of said polyurethane/ureas, of lateral and/or terminal hydrophilic chains containing ethylene oxide units.

12. The process of claim 10 wherein said polyurethane/ureas contain 10 to 120 milliequivalents, per 100 grams of polyurethane/ureas, of chemically incorporated anionic groups and up to about 10% by weight, based on the weight of said polyurethane/ureas, of lateral and/or terminal hydrophilic chains containing ethylene oxide units.

13. A coating prepared from the polyurethane/ureas of claim 1.

14. A coating prepared from the polyurethane/ureas of claim 1 wherein the polyurethane/ureas used to prepare the coating contain hydrophilic groups and are dispersed in an aqueous medium.

* * * * *